United States Patent Office 3,619,906
Patented Nov. 16, 1971

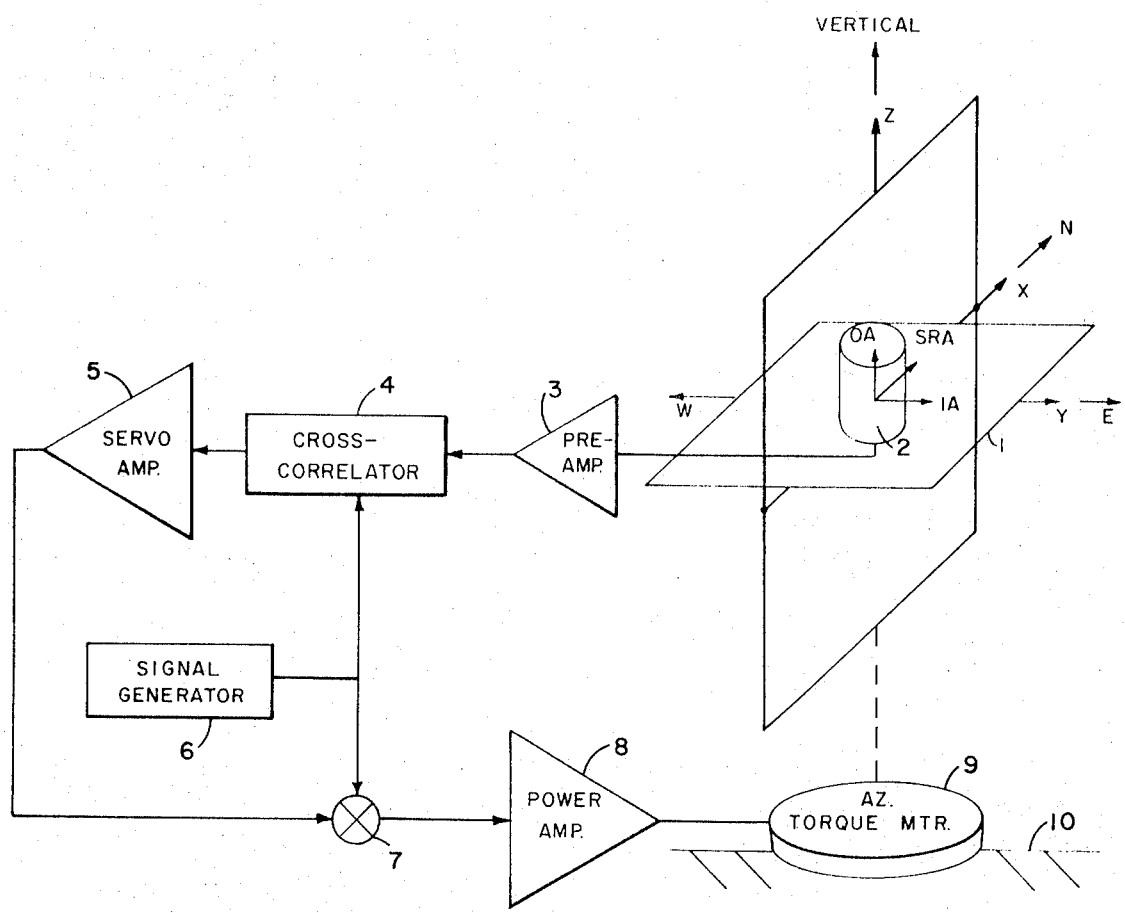

3,619,906
OSCILLATING NORTH-SEEKING PLATFORM
Robert E. Yates and Lester M. Ross, Huntsville, Ala., assignors to the United States of America as represented by the Secretary of the Army
Filed May 5, 1969, Ser. No. 821,900
Int. Cl. G01c 19/38
U.S. Cl. 33—226       2 Claims

ABSTRACT OF THE DISCLOSURE

A self-alignment system for a gyro-stabilized platform. The system uses the earth's rotation rate, sensed by an east-west oriented rate gyro mounted on the platform, to drive the approximately aligned platform into E–W and N–S alignment with a high degree of accuracy. The accuracy is gained by employing a comparison technique to separate the gyro output signal of earth's rate from the random part of the output caused by imperfection in the gyro. A sinusoidal signal generator actuates an azimuth torque motor to oscillate the platform about a vertical axis. This sinusoidal oscillation and a sinusoidally modulated earth rate with its swings about null not accurately equal combine to form the signal picked off at the vertically oriented output axis of the gyro. This signal is compared with the generator signal and a resulting signal is added to the azimuth torque motor input such as to accurately equalize the platform swings to each side of the true alignment direction.

BACKGROUND OF THE INVENTION

This invention is in the field of inertially stabilized platforms. Such platforms are used in guided missile launch systems to provide stable reference planes. During the laying of the missile, the platform must be referenced to north. With the heretofore known platforms, this requires that the missile firing site have a north line surveyed in and that the platform be aligned to the line by means of optical theodolites on the ground and prisms on the stabilized element of the platform. One way by which the surveyed launching site, theodolite and operator, and prisms might be eliminated would be the use of a platform-carried gyro to sense earth's rotation rate in proportion to misalignment of the gyro from north. This has the disadvantage that achievable accuracy is dependent on the quality of the gyro. A gyro with 0.001 degree per hour drift (an acceptable drift for many missile laying problems) is very expensive compared to a gyro with 0.1 degree per hour drift. The instant invention is able to use gyros having normally unacceptable drift rates.

SUMMARY OF THE INVENTION

The present invention is a platform self-alignment system which uses cross-correlation to improve accuracy. The earth-mounted platform is maintained level by any of the well known techniques, such as a pendulum or bubble level actuated servo system, and has a rate gyro with its SRA (spin reference axis) and IA (input axis) in the level plane of the platform. The OA (output axis) of the gyro is normal to the level plane, and points away from the earth. With the platform properly aligned, the gyro SRA points north, and the IA points east. The gyro, in this alignment, receives no earth's rate input. The platform is oscillated about its vertical axis (also the gyro OA) by a sine wave applied to a torquer. The gyro gives an output corresponding to both the sine wave and earth's rate. This output is cross-correlated with the sine wave, and the resulting product is processed and added to the sine wave to give a torque output signal. The torque output signal causes the platform to oscillate angularly about a vertical axis. The average position of the SRA of the gyro is a north-south line. If the platform attempts to drift, the output of the gyro will contain a component directly related to the drift, and the torque signal will provide correction.

BRIEF DESCRIPTION OF THE DRAWING

The single drawing figure shows the invention in schematic form.

DESCRIPTION OF THE PREFERRED EMBODIMENT

Referring to the drawing, a level platform 1 is shown with the platform axes $x$ and $y$ aligned approximately to north and east. Rate gyro 2 is shown mounted on the platform, with its axes indicated vectorially. In operation, signal generator 6 generates a signal which feeds into summer 7. The output of 7 drives power amplifier 8, and 8 drives the azimuth torque motor 9. This motor forces the platform to oscillate about its azimuth (vertical or Z) axis sinusoidally with relation to the earth 10. This oscillation causes the gyro IA to also oscillate sinusoidally with relation to the earth's rate vector. If the platform is in perfect north-south alignment, the earth's rate sensed by the IA will be sinusoidal, with equal swings about null. If there is azimuth misalignment, the gyro output signal is unbalanced, and is made up of a sinusoid containing misalignment information and noise due to random gyro drift. The gyro output is amplified by pre-amplifier 3, then fed into a comparator in the form of cross-correlator 4. The signal from signal generator 6 is also fed into the cross-correlator. The cross-correlator correlates the signals from the pre-amplifier and the signal generator in such a way that only the part of the pre-amplifier signal that correlates with the signal from the signal generator appears as an output from the correlator. Servo amplifier 5 amplifies the output of 4 and passes the amplified signal to summer 7. The output of the summer (and power amplifier 8) contains a signal component to drive the azimuth axis of the platform to null. At null, the platform will oscillate about the correct alignment direction, and minimize the output of the cross-correlator. A simple average of the platform oscillation then indicates north. As can be seen on the drawing, the OA is coincident with the platform Z (vertical) axis, and the SRA and IA are respectfully coincident with the $x$ and $y$ axes of the platform. The $x$ and $y$ axes are in a level plane, and oscillate therein the $x$ axis about the north and the $y$ axis about the east direction.

It should be noted that the rotor case or housing (that portion of the gyro supporting the gyro rotor) of gyro 2 must be electrically caged to its case to assure that the IA of the gyro maintains its alignment with the platform. The effect of the vertical component of earth's rate on the gyro must be biased out. Both of these can be accomplished by known techniques and do not comprise part of the invention. The output of the gyro is an electrical signal, derived in any of the well known manners. Obviously, lead or lag compensation may be needed in the loop including servo amplifier 5. Again, this could be provided in the well known manner, and does not comprise part of the invention. Cross correlator 4 is of the type used in radar systems. A specific example of such a correlator is that shown on p. 419 of the book "Introduction to Radar Systems," by M. I. Skolnik. This book was published in 1962 by McGraw-Hill Book Company, and bears library of Congress Catalogue Card No. 61–17675.

We claim:

1. An earth-mounted north-seeking system employing a level platform with a gyro mounted thereon, wherein the SRA and IA of said gyro are in a plane parallel to said platform, and the OA of the gyro is normal to the platform, and pointing away from the earth, said gyro having an electrical output;

means, including signal means having an output, for oscillating said platform about an axis vertical to the platform; a cross-correlator having inputs and an output, each of said outputs of said gyro and said signal means connected to respective inputs of said cross-correlator;

said means for oscilating additionally including summing means having inputs connected respectively to said output of said signal means and to the output of said cross-correlator, and an output; and torquing means mechanically connected to said platform and electrically connected to said output of said summing means.

2. The system as defined in claim 1 wherein said gyro is a rate gyro.

References Cited

UNITED STATES PATENTS

| | | | |
|---|---|---|---|
| 2,981,113 | 4/1961 | Erdley | 33—226 Z UX |
| 3,071,012 | 1/1963 | Baring-Gould | 33—226 Z UX |
| 3,231,984 | 2/1966 | Howe et al. | 33—226 |
| 3,272,018 | 9/1966 | Watt | 33—226 Z UX |
| 3,280,642 | 10/1966 | Noxon | 74—5.4 |
| 3,355,954 | 12/1967 | Levine et al. | 33—226 Z UX |

ROBERT B. HULL, Primary Examiner

U.S. Cl. X.R.

318—649